(12) United States Patent
Kurts et al.

(10) Patent No.: US 6,331,957 B1
(45) Date of Patent: Dec. 18, 2001

(54) INTEGRATED BREAKPOINT DETECTOR AND ASSOCIATED MULTI-LEVEL BREAKPOINT TECHNIQUES

(75) Inventors: Tsvika Kurts, Haifa; Ofer J. Nathan, Kiryat Yam, both of (IL); John M. Zavertnik, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/503,535

(22) Filed: Feb. 14, 2000

(51) Int. Cl.[7] ............... G11C 7/00; G06F 7/38
(52) U.S. Cl. ............... 365/201; 714/7; 712/227
(58) Field of Search ............... 365/201, 189.12; 714/7; 712/227, 244

(56) References Cited

U.S. PATENT DOCUMENTS

| | | | |
|---|---|---|---|
| 4,503,459 | * 3/1985 | Boudreau | 364/200 |
| 5,889,981 | * 3/1999 | Betker et al. | 395/568 |
| 6,073,251 | * 6/2000 | Jewett et al. | 714/7 |

FOREIGN PATENT DOCUMENTS

| | | |
|---|---|---|
| 0 702 297 A2 | 3/1996 | (EP) . |
| 0 762 278 A1 | 3/1997 | (EP) . |
| 0 849 669 A1 | 6/1998 | (EP) . |

OTHER PUBLICATIONS

Kumar, Jiten, Gould Inc. "Simplifying Debugging With Conditional Triggering—Part I," New Electronics, 19(1986) Mar., No. 5, London, Great–Britain.

* cited by examiner

Primary Examiner—Vu A. Le
(74) Attorney, Agent, or Firm—Jeffrey S. Draeger

(57) ABSTRACT

An integral breakpoint detector. The integral breakpoint detector may be included in a processor, a chipset, or another bus agent. One embodiment is an apparatus such as an integrated circuit that includes a bus interface to communicate with a bus and an integrated breakpoint detector. The bus interface may include a bus tracker which communicates with the integrated breakpoint detector. The integrated breakpoint detector is to provide a first indication responsive to an occurrence of a predetermined relationship between a programmable value and a condition related to the bus.

26 Claims, 11 Drawing Sheets

CONFIG & MASK REGISTERS
REGISTER NAME: VIS_CONFIG

| 7 | 6 | 5 | 4 | 3 | 2 | 1 | 0 |
|---|---|---|---|---|---|---|---|
| RSRV | MSK_DAT | MSK_ADDRB | MSK_REQB | MSK_ADDRA | MSK_REQA | RSRV | FSB_EN |

REGISTER NAME: MASK_BIT_REQAB

| 7 | 6 | 5 | 4 | 3 | 2 | 1 | 0 |
|---|---|---|---|---|---|---|---|
| MRB_4 | MRB_2 | MRB_1 | MRB_0 | MRA_3 | MRA_2 | MRA_1 | MRA_0 |

REGISTER NAME: MASK_ADDRESS_AB

| 7 | 6 | 5 | 4 | 3 | 2 | 1 | 0 |
|---|---|---|---|---|---|---|---|
| MB24_31 | MB16_23 | MB8_15 | MB3_7 | MA24_31 | MA16_23 | MA8_15 | MA3_7 |

REGISTER NAME: MASK_DATA

| 7 | 6 | 5 | 4 | 3 | 2 | 1 | 0 |
|---|---|---|---|---|---|---|---|
| MD56_63 | MD48_55 | MD40_47 | MD32_39 | MD24_31 | MD15_23 | MD8_15 | MD0_7 |

ARM REGISTERS
REGISTER NAME: ARM_ADDRA

| A31 | A30 | ... | A6 | A5 | A4 | A3 | 0 | 0 |

REGISTER NAME: ARM_REQAB

| RQB | RQB | RQB | RQB | RQA | RQA | RQA | RQA | BE7 | BE.. | BE1 | BE0 | EX7 | EX.. | EX1 | EX0 |
| 4 | .. | 1 | 0 | 4 | .. | 1 | 0 | | | | | | | | |

REGISTER NAME: ARM_DATL

| D31 | D30 | ... | D6 | D5 | D4 | D3 | D2 | D1 | D0 |

REGISTER NAME: ARM_DATH

| D31 | D30 | ... | D6 | D5 | D4 | D3 | D2 | D1 | D0 |

FIG. 7

INTEGRATED BREAKPOINT DETECTOR AND ASSOCIATED MULTI-LEVEL BREAKPOINT TECHNIQUES

BACKGROUND

1. Field

The present disclosure pertains to the field of integrated circuits. More particularly, the present disclosure pertains to the field of testability and internal observation techniques for an integrated circuit.

2. Description of Related Art

As integrated circuit complexity continues to rise, the ability to track the internal sequencing of operations continues to drop. This loss of visibility into the inner workings of an integrated circuit such as a processor disadvantageously complicates the process of debugging problems encountered while executing programs. Accordingly, improving visibility may desirably assist those writing or debugging some software programs or the integrated circuit hardware itself.

Visibility into internal operations of processors often decreases due to features of such processors that further distance externally visible bus or other transactions from activities of inner processing engine(s). Such features may advantageously improve processor throughput but may have the unfortunate side effect of decreasing internal visibility. For example, modern processors speculatively execute strings of instructions after a branch instruction before it is known whether the branch will be taken. To an external observer, such speculative execution is misleading as to the actual flow of execution undertaken by the processor when branch mispredicts occur. Thus, the internal instruction pipeline becomes increasing detached from the memory execution engine.

Furthermore, modern bus interface units themselves may employ sophisticated bus transaction protocols which complicate attempts to decipher even the string of transactions occurring on the bus. For example, the Pentium® Pro Processor, the Pentium® II Processor, and the Pentium® III Processor from Intel Corporation of Santa Clara, California employ a heavily pipelined, token-based front side bus (FSB) protocol that allows deferred transaction replies. This type of split transaction bus eliminates the former address/data sequencing that allowed simple association of memory data to particular addresses based on the bus contents. Instead, data from various different requests may appear on the bus in a different order than the requests. Moreover, data may be returned many clocks after the request is completed. Thus, even viewing the external bus itself provides limited insight into the operation of the processor.

Prior art techniques that improve internal visibility include the use of scan chains and breakpoint registers. Scan chains provide information about a number of internal nodes. Traditional scan chains do not provide an automatic triggering mechanism based on internal state. Typical scan chains report internal state at an externally determined point in time rather than due to the occurrence of particular internal events. Breakpoint registers cause a processor to stop execution when an internal instruction pointer reaches a value programmed in a breakpoint register. Breakpoint techniques, however, track the state of the pipeline, reporting when a particular instruction is being executed but not the data operated on by that instruction. Thus, breakpoint techniques do not adequately improve the ability to observe values being generated by instructions, nor do they provide visibility into memory access content and sequencing, cache utilization, external snooping, or other cycles typically issued to the FSB.

Additionally, prior art techniques to observe even externally visible buses are becoming inadequate. An externally visible bus is a bus which appears on a circuit board or other inter-component medium. In other words, it is a bus between two components. Probes which intercept these signals are increasingly invasive as the sensitivity to even minor load changes may confound or even cause problems. Moreover, some probing devices may not be able to capture data at a sufficiently rapid rate to actually analyze signals on some high-speed buses. Unfortunately, slowing down the bus to allow signal capture and analysis may also confound, remove, or cause problems.

Thus, prior art techniques are becoming increasingly inadequate. For integrated circuits that have high speed external buses, prior art bus signal observation techniques are exhibiting frequency-related limitations. For integrated circuits that additionally or alternatively have important buses integrated within the integrated circuit, prior art internal observation techniques may not provide sufficient visibility into memory operations. These problems are generally compounded by increasing levels of integration and increasing bus frequencies.

BRIEF DESCRIPTION OF THE FIGURES

The present invention is illustrated by way of example and not limitation in the figures of the accompanying drawings.

FIG. 7 illustrates a set of registers that may be used in one embodiment.

DETAILED DESCRIPTION

The following description discloses an integrated breakpoint detector and associated multi-level breakpoint techniques. In the following description, numerous specific details such as signal names, bus types, bus protocols, component types, and logic partitioning/integration choices are set forth in order to provide a more thorough understanding of the present invention. It will be appreciated, however, by one skilled in the art that the invention may be practiced without such specific details. In other instances, control structures and gate level circuits have not been shown in detail in order not to obscure the invention. Those of ordinary skill in the art, with the included descriptions, will be able to implement appropriate logic circuits without undue experimentation.

Disclosed techniques may advantageously improve visibility into the internal workings of an integrated circuit. Some embodiments may advantageously allow non-intrusive observation of external bus conditions for high speed buses that are difficult to probe or otherwise analyze using conventional techniques. Some embodiments provide an improved ability to detect sequences and content of memory access. Some embodiments effectively provide some on-die logic analyzer functionality by providing complex triggering capabilities.

Several advantages arise from using on-die circuitry to observe various bus transactions. First, an event may be detected without probing sensitive or possibly unavailable high speed bus lines. As frequencies increase external probing as a method of debugging is increasingly problematic not only because high enough speed probing hardware may not be available, but also because such probing may mask or even cause problems. Additionally, as integration increases, certain buses such as a processor-memory controller bus may no longer be externally visible. In such cases, probing using traditional system probe techniques is not even possible.

Secondly, on-die circuitry capable of detecting matches, setting breakpoints, etc., may advantageously use internal signals as cues for when to trigger events. In modern complex bus protocols (e.g., the Pentium Pro Processor bus as described above, Rambus™ buses, etc.), even if signals are captured, it may still take significant decoding to determine the exact operation that was captured. Since internal state machines and other logic or signals are available to an integrated breakpoint detector, such a device may more easily detect desired events and signal their occurrence. Moreover, an integrated circuit with a breakpoint detector may be used in a real-world system environment operational at full speed or otherwise under normal operating conditions. Analysis may be performed with little or no impact on the processing or communication bandwidth of the integrated circuit.

Figure 1:
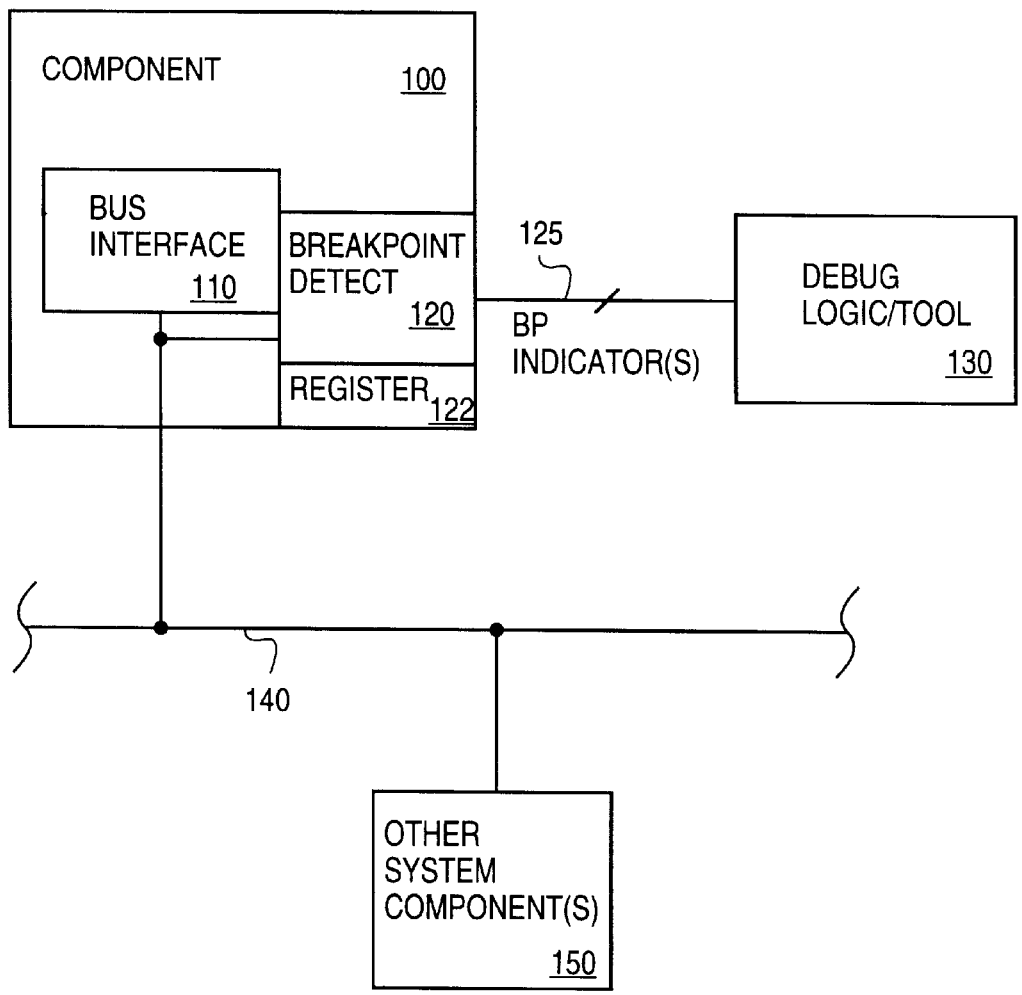
FIG. 1 illustrates one embodiment of a system having a component with an integrated breakpoint detector.

FIG. 1 illustrates one embodiment of an integrated breakpoint detector. In the embodiment of FIG. 1, a component 100 includes a bus interface 110 and a breakpoint detector 120. Coupled to, or included within, the breakpoint detector 120 is a programmable register 122. This register 122 serves as an "Arm" register which is capable of storing a value indicating a condition for a bus 140 that causes the breakpoint detector to provide an indication on signal line 125. This indication is received by a debug tool or debug logic 130.

The integrated breakpoint detector is capable of providing the indication in response to the occurrence of a predetermined relationship between a value stored in the register 122 and a condition related to the bus. One example is that the breakpoint detector 120 may generate the indicator when a particular value stored in the register 122 is driven to the bus. In this case, a matching function is performed by the breakpoint detector. In another case, the breakpoint detector may generate the indicator prior to the occurrence of a particular bus cycle. This may be possible because the integrated breakpoint detector is integrated into the component 100 and therefore may be coupled to receive signals providing hints regarding such activity from internal circuitry such as a bus tracker or other logic within the bus interface logic 110.

Additionally, the breakpoint detector may understand and utilize the internal state of a complex bus state machine. In some embodiments, the breakpoint detector may be able to match addresses with data which is returned in deferred, split, or other types of complex bus transactions. In such cases, the breakpoint detector advantageously utilizes insight into the internal operations of the component 100 to generate externally available indicators that assist in debugging software, analyzing component performance, or otherwise analyzing the operation of the component 100.

Thus, the breakpoint detector 120 may detect a wide variety of conditions that may be related to bus conditions in a variety of ways. The detected condition may be related precisely to the signals driven on the bus, related loosely to signals on the bus (e.g., before or after those signals are driven or relating only to a subset of the bus), or related to the inner operation of a bus state machine or other logic. The occurrence of the particular chosen condition may be unobtrusively detected (i.e., no external probes or other additional loads are added) in some embodiments.

Notably, the component 100 is operative within a system environment. Accordingly, as indicated by block 150, there are other system components coupled to the bus 140. For example, in one embodiment, the component may be a processor, and memory, I/O, display, etc., devices may be coupled to the bus 140. In other embodiments, the component 100 could be virtually any other type of integrated circuit device or component. Using an integrated breakpoint detector may be advantageous in any case where better internal visibility is desirable for a component which interacts with other components over a bus.

Figure 2:
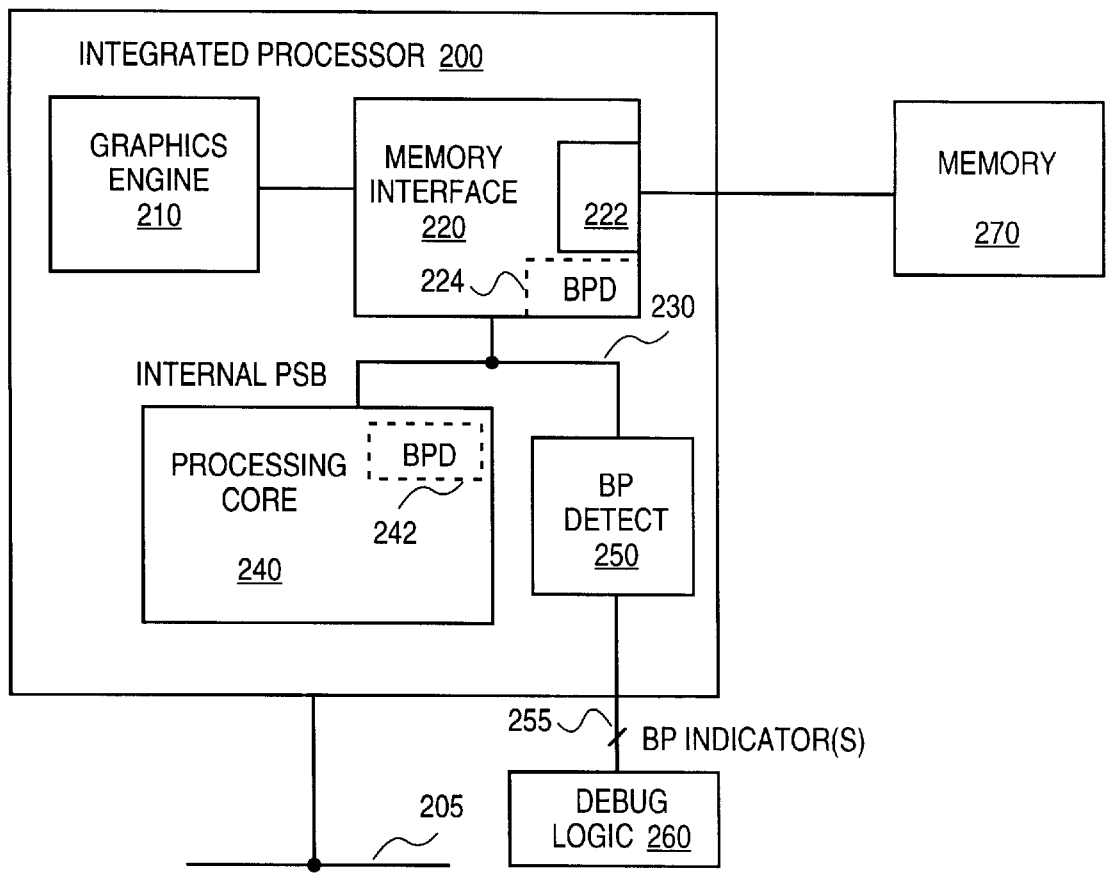
FIG. 2 illustrates one embodiment of a system that utilizes integrated breakpoint logic that may be located in a variety of functional areas.

FIG. 2 illustrates an embodiment including a breakpoint detector within an integrated processor 200. The need for an integrated breakpoint detector may be particularly acute in the case of an integrated processor because traditionally available buses, such as a processor front-side bus (FSB) may be integrated into the component and therefore not visible externally during normal operations.

In the embodiment of FIG. 2, the integrated processor 200 includes a graphics engine 210, a processing core 240, and a memory interface 220. Thus, an internal FSB 230 is not visible external to the integrated processor during normal operation. The integrated processor may be coupled to other system components (e.g., I/O) by a bus 205 and may be coupled to a memory 270, making the memory and I/O interfaces the main externally visible buses. Unfortunately, observation of only the memory and I/O interface buses may provide only very limited insight into the operation of the processor 200 since there is a processing core and graphics engine integrated therein. In addition, the I/O may operate in different clock domains (i.e., at different frequencies), increasing the difficulty of synchronizing external memory and I/O events.

Accordingly, one or more breakpoint detect circuits may be included. One embodiment includes a stand-alone breakpoint detector 250 which observes transactions on the FSB 230 and triggers according to programmed values. In the illustrated embodiment, the breakpoint detector 250 generates breakpoint indicators on a signal line 255 to debug logic 260. The debug logic or tool varies according to the particular testing being undertaken.

Alternatively, a more powerful breakpoint detector may be possible if the breakpoint detector has visibility into the internal state machines of one or more of the controllers for an integrated bus. For example, if the processing core 240 is a processing core that has a highly complex FSB state machine such as the Pentium Pro processor and a number of subsequent processors from Intel Corporation, it may be advantageous to tap into various signals within the bus state machine to track bus activity. Thus, the breakpoint detector BPD 242 may be included with the processor core logic. Additionally, the memory interface may include similar state logic and information to interact with the FSB 230. Therefore, the breakpoint detector BPD 224 within the memory interface 220 may be used.

The breakpoint detector 224 may additionally or alternatively interact with memory interface logic 222. This memory interface converts memory requests from the processing core 240 and the graphics engine 210 into signals that the memory 270 understands. In modern memory architectures, the signals transmitted to the memory may be extremely high speed and may be difficult to capture with external probing or logic analyzer type tools. For example, if the memory 270 is arranged as a set of Rambus RDRAMs operating along a Rambus channel, probing may be quite difficult. Accordingly, the breakpoint detector BPD 224 may be programmed to signal when certain events occur on the Rambus channel. Thus, the BPD 224 may interact with Rambus Asic Cell (RAC) logic or RAC output signals to detect events.

Figure 3:
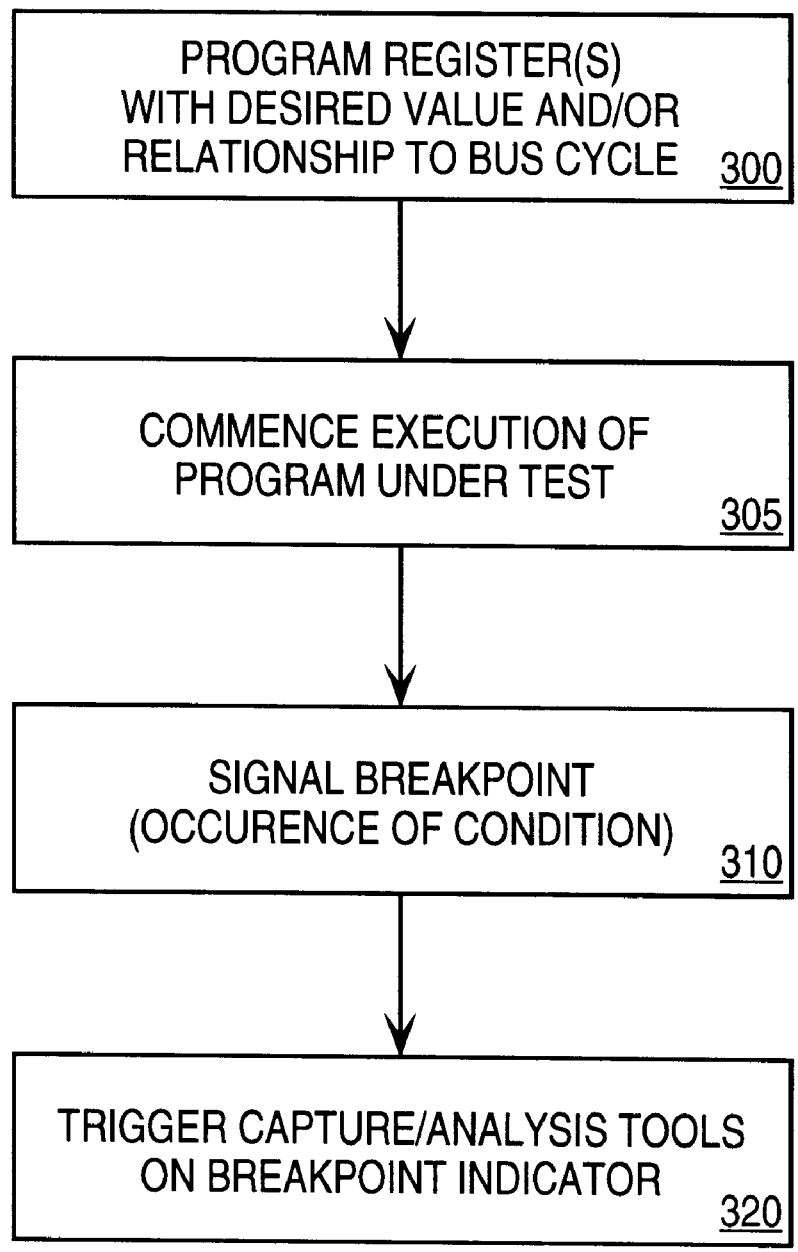
FIG. 3 illustrates one embodiment of a method utilizing an integrated breakpoint detector.

FIG. 3 illustrates a flow diagram for some embodiments of the systems shown in FIGS. 1 and 2. In FIG. 3, block 300, one or more registers are programmed within the component to indicate a desired value or relationship to a condition of the bus. This may be performed by programming configuration registers (e.g., as part of a debugging utility or other initialization program). As discussed with respect to FIG. 1, these conditions and relationships may vary. In block 305, a program under test is started. In some cases, programs only "misbehave" or malfunction under certain conditions. The test conditions under which the program is run may or may not be carefully controlled, depending on the analysis being performed.

In block 310, if the chosen condition occurs, the breakpoint is signaled. The breakpoint signal indicates that under the chosen test conditions the problem did occur. Capture and/or analysis tools may be triggered from the breakpoint indicator as shown in block 320. For example, an internal debug mode may be used to determine the states of internal registers or other nodes. Additionally or alternatively, a scan chain may be employed to observe internal nodes. Advantageously, the breakpoint detector has provided a trigger to the external world to pinpoint the time at which these tools should be invoked or at least the time around which analysis may be concentrated.

Figure 4:
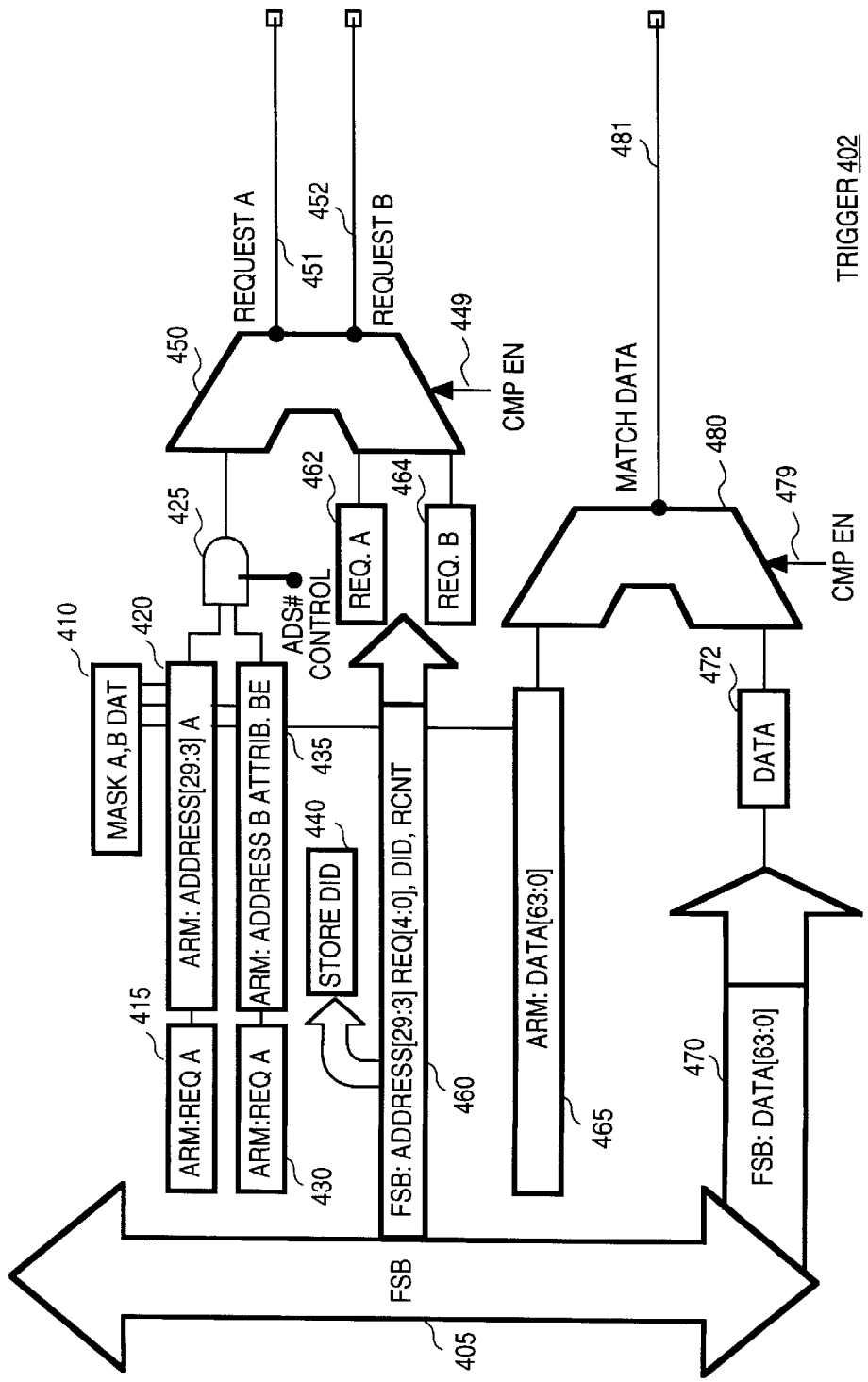
FIGS. 4a and 4b illustrates details of embodiments of triggering logic.

FIGS. 4a and 4b illustrate one embodiment of a component 400 having triggering logic for detecting certain conditions. In the embodiment of FIG. 4b, one set of breakpoint logic is shown (request A, request B, and data). In some embodiments such as that shown in FIG. 4a and further discussed below, multiple sets of such breakpoint logic or at least multiple breakpoint registers may be included to detect more complex bus interactions or conditions. In other words, multi-level triggering may be achieved by detecting a sequence of bus transactions.

In the embodiment of FIG. 4a, a set of bus transaction registers 403-1 to 403-N are provided to store details of N individual bus transactions. These bus transaction registers are coupled to comparison logic 401 and in one embodiment temporarily store address, control, and data information for a bus transaction until the response phase. At or after the response phase, the information stored in these registers may be compared to data stored in programmable ARM registers. The comparison logic 401 is controlled by triggering state logic 405 and compares values on a bus 407 to values in the transaction registers. The bus 407 may be a variety of signals internal to the component 400 or may be a bus that is driven externally. The state logic 405 controls when the comparison logic 401 performs which particular comparison and receives the results of such comparisons. All comparisons may be simultaneously enabled using parallel comparison circuits within comparison logic 401, or comparisons of the various transactions may be performed sequentially using shared or individual comparison circuits. The triggering state logic 405 provides externally available breakpoint indicators 406 to indicate when bus transactions programmed into the bus transaction registers 403 occur.

The triggering logic 402 shown in FIG. 4b may be the basic unit that is duplicated. The number of outputs may vary, and some outputs may be combined or used by the state logic 405. For example, each set of triggering logic may output only one triggering signal when all three conditions are satisfied. Additionally, each individual set of triggering logic may interact with an independent state machine within the triggering state logic 405 (see, e.g., FIG. 6) to allow more complex bus transactions (e.g., deferred reply transactions) to be individually ad accurately tracked.

The triggering logic 402 illustrated in FIG. 4b includes registers that are compared against first and second request cycles and a data cycle to detect matches or partial matches. Partial matches may be detected by masking portions of the comparison as specified by a mask register. In particular, registers 415 and 420 store triggering values for a first request portion and a first address portion. These registers "Arm" a particular breakpoint to be signaled once they are programmed. The request portion may define a particular type of a bus cycle. The address portion specifies some or all address bits (e.g., Address[29:3] as shown). An address and request comparison may be gated by an AND gate 425 with the ADS# signal or an equivalent signal which indicates that a valid request is being driven on the bus. A comparator 450 compares the request and address values to values stored in a register 462 from the front side bus (FSB) as received on signal lines 460. A match may be indicated on a signal line 451. Notably, this embodiment refers to the FSB; however, other buses may be monitored and internal signals (rather than the external bus) may also or alternatively be monitored.

Similarly, registers 430 and 435 store triggering values for a second request portion and a second address and/or attribute portion. The comparator 450 may again indicate partial or full equivalence with FSB signals stored in a register 464 by an indication signaled on a signal line 452. Additionally, a register 440 may be used to track the device ID (DID) for a particular bus transaction. This may be useful in tracking bus cycles on a split transaction or deferred reply style bus. Further details of use of DID and register 440 are discussed below with respect to FIG. 6. A data register 465 stores a triggering data value for the data bus. A comparator 480 compares data stored in a register 472 from the FSB via signal lines 470 to data from the register 465. The comparator 480 signals a data match on a signal line 481. In one embodiment, the triggering state logic 405 (FIG. 4a) delays generation of comparator enable signals on signal lines 449 and 479 until after a response is received for the bus request. Thus, all comparisons (request A, request B, and data) may be performed at once. In other embodiments, comparisons may be performed in other orders.

In the embodiment of FIG. 4b, a mask register 410 allows selective masking of various portions of the triggering request, address and data signals. The comparators operate such that masked bits are considered to be matches, allowing additional flexibility. For example, bus cycles that do not utilize certain request, address, or data portions can be detected by masking bits which may be at indeterminate or unimportant levels. Additionally, it may be possible to match a variety of values by masking a particular set of bits. For example, masking some low order address bits may allow detecting of accesses that fall within a particular page.

Figure 5:
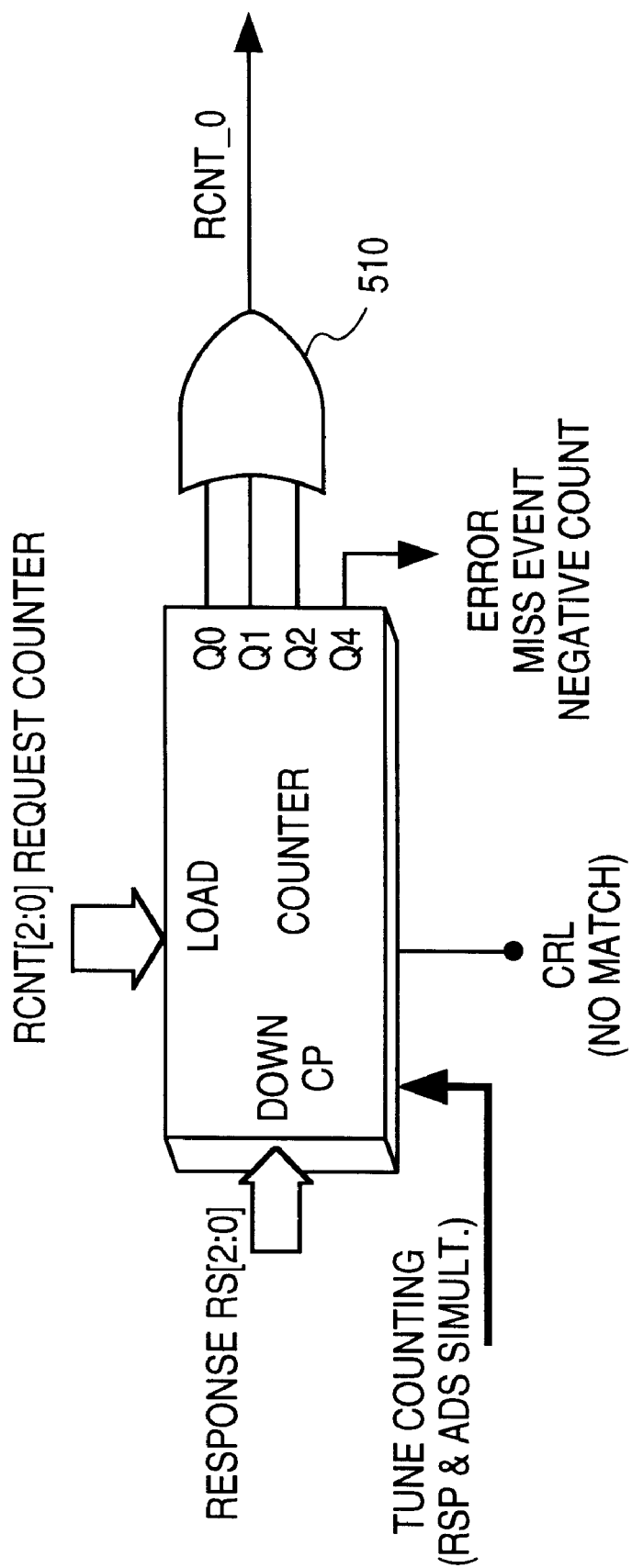
FIG. 5 illustrates one embodiment of a counter that may be used to track bus cycles.

The triggering state logic 405 shown in FIG. 4a may include one or more sets of internal triggering logic to detect sophisticated bus transactions or multiple transaction sequences. FIG. 5 illustrates one embodiment of counter logic that may form a part of such internal triggering logic. In FIG. 5, a counter 500 may be used to count the number of remaining bus cycles before a particular bus transaction is completed. The counter 500 may be loaded with a three bit request counter RCNT[2:0] indicating the bus pipeline depth. Each time a valid response is returned on a response bus RS[2:0], the counter decrements. When the request counter reaches zero, an appropriate signal is generated (e.g., RCNT_0 as output from an OR gate 510). The counting may be further tuned to ensure that only certain appropriate responses are counted. For example, the response (RS) and ADS# signals may be used in some embodiments.

Additionally, the request counter 500 may indicate that an error has occurred if a particular event is missed or if a negative count is somehow reached. Additionally, if no match does occur, this too may be signaled by the counter 500. Such missed events or failure-to-match events may occur for several reasons. Depending on the sophistication of the particular breakpoint detector, it may not comprehend all intricacies of the bus protocol it is observing and therefore may miss certain cycles. Alternatively, a missed event may provide an indication of an error. Other mechanisms such as up/down pointers or other structures that track progression of pipelined cycles on the bus may be used.

Figure 6:
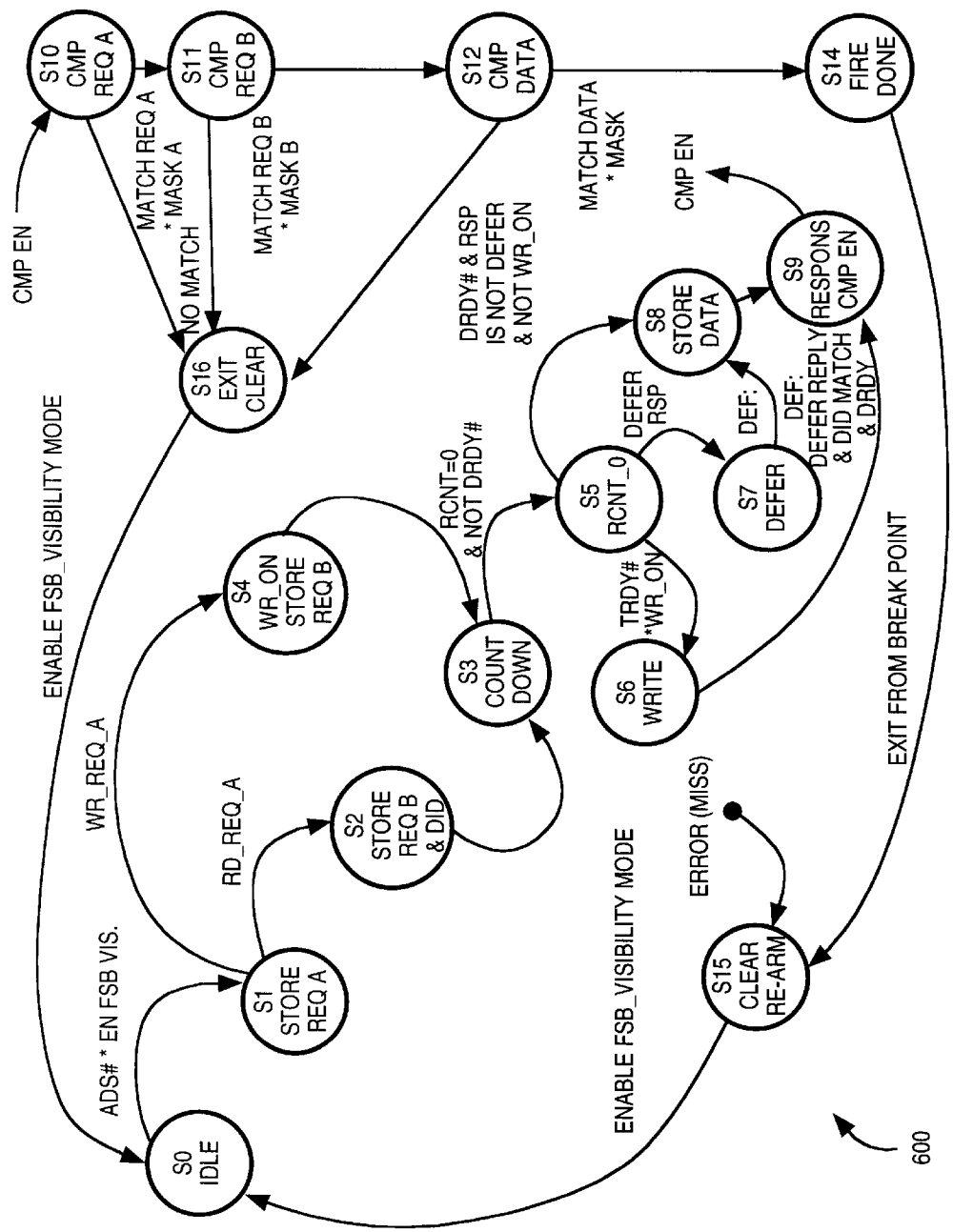
FIG. 6 illustrates a state diagram for a state machine that may be used in one embodiment.

In order to provide sophisticated event detection, the triggering state logic 405 may also include one or more state machines that key off of an internal bus state machine of the component. One embodiment of such a state machine 600 is shown in FIG. 6. The embodiment of FIG. 6 receives signals from an already existing bus state machine, so it need not recreate or otherwise predict the internal operation of the component. The breakpoint detector can directly observe these internal operations because its integrated nature allows substantially more signals to be shared. The embodiment of FIG. 6 also interacts with the counter shown in FIG. 5 to provide additional assistance in tracking bus cycles.

The state machine provides triggering for a bus transaction with two request/address portions and a data portion. In state S0, the state machine is idle. In response to the ADS# signal being asserted (indicating the start of a bus cycle) and the FSB visibility logic (i.e., the breakpoint detector) being enabled, the state machine transitions to state S1. In state S1, a first portion of data is stored for request phase one. Thus, in the embodiment of FIG. 4b, the first request and first address values driven to the FSB are stored in the register 462. If the cycle requested was a read request (as indicated by the request bits), the state machine transitions to state S2. In state S2, a similar store operation is performed with respect to the second request phase, with the second request portion being stored in register 464. Additionally, the Device ID (DID) is stored. After the DID is stored (e.g., in register 440 of FIG. 4b), the state machine transitions to state S3.

The state machine may also have arrived at state S3 in the case of a write cycle. From state S1, if the request is a write request, the state machine transitions to state S4. In state S4, bits pertinent to the occurring write cycle are stored and a write indicator (WR_On) is set.

In either the case of a read or a write, state S3 performs a count down depending on the length of the transaction. The counter 500 shown in FIG. 5 may be used to perform the countdown. Other counters may be used according to the details of the bus state machine which generates the bus cycles that are being analyzed by the breakpoint detector. When the terminal count is reach (RCNT=0) but before the data is returned, the state machine transitions to state S5.

In state S5, the breakpoint detector is potentially about to receive the data from the FSB to which the triggering data value will be compared. If the TRDY# signal (indicating that the target is ready to receive write data is asserted) and WR_ON is asserted (meaning that it is a write transaction), then the state machine transitions to state S6, wherein the data is about to be transmitted. In response to DRDY# being asserted (indicating that data is available for latching on the bus) in state S7, the data is stored and the state machine transitions to state S9. In state S9, the breakpoint detector begins its comparison procedure (CMP EN marks a transition from state S9 to state S10).

In state S10, the breakpoint detector assesses whether the first part of the request, as masked by the mask register, matches the signals captured. If so, in state S11, the breakpoint detector determines whether the second part of the request, as masked by the mask register, matches the signals captured. If so, in state S12, the breakpoint detector determines whether the data, as masked by the mask register, matches the signals captured. If a mismatch occurs in any of states S10, S11, or S12, state S16 is entered, clearing the breakpoint detector, exiting that comparison cycle, and returning the state machine to the idle state S0. If no mismatch occurs, the breakpoint detector fires in state S14, clears and rearms in state S15, and then returns to the idle state S15.

Back at state S5, if a defer response occurs, a defer state S7 is entered. In this case, the bus cycle can not be completed at this time. The state machine waits until the proper target device is ready. Thus, the DID captured from the bus at the start of the transaction is analyzed to detect when the appropriate bus agent is ready to complete the transaction. When a deferred reply is signaled on the bus, DID matches, and DRDY# is signaled, then the state machine transitions from S7 to state S8 where the data is stored. Thereafter, the previously described state S9 is entered.

Again returning to state S6, if DRDY# is asserted and the response is not to defer completion of the bus cycle, but WR_ON is not asserted (a read cycle), state S8 is again entered, resulting in the data being stored. Thereafter, the previously described state S9 is entered, followed by the comparisons of states S10 and the following states. Also, if an error (a miss) occurs at any point in time, state S15 is entered, clearing the breakpoint detector, and returning the breakpoint detector to the idle state S0. Address, control, data, and/or other information stored in the programmable registers to trigger the breakpoint detector may also be reset.

FIG. 7 illustrates programmable registers that may be used in one embodiment. A VIS_Config (visibility feature configuration) register includes eight bits as shown. Bits 6:2 enable the masking of various portions of the request, address, and data trigger values. Bits 7 and 1 are reserved, and bit 0 enables or disables the entire FSB visibility feature (e.g., the breakpoint detector).

The MASK_bit_ReqAB register specifies further details on masking of the first and second requests. Bits 3:0 allow masking of any four of the five-bit request signal (e.g., as used in the Pentium® Pro Processor, the Pentium® Processor II, and the Pentium® III processor buses) for the first request. Similarly, bits 7:4 allow masking of any four of the five bits of a second request.

The MASK_AddressAB register specifies further details on masking of the first and second addresses. Bits 3:0 allow masking, for a first address, any of four bytes of a thirty two bit address (or a twenty-nine bit address if address bits replaced by byte enables are excluded). Bits 7:4 allow similar masking for the second address. In a similar fashion, the MASK_Data register specifies masking for the triggering data value. Each of the bits of the MASK_data register specify whether a particular byte of the triggering data value is to be masked. When the comparison is performed, any masked request, address, or data portions are treated as if a match occurred.

The actual triggering values are stored in the "Arm" registers to Arm the breakpoint detector to trigger upon the specified events. The triggering addresses may be stored in two registers ARM_AddrA and ARM_AddrB (not shown). ARM_AddrB may not be needed if the second request phase is not expected to have its own unique address that needs to be detected. <<Tsvika, is this correct, or why else is there no such register shown>> The triggering request information for both requests may be stored in a single register, ARM_ReqAB. The data triggering value may be stored in two registers, ARM_DatL and ARM_DatH.

In one embodiment, these registers may be programmed by the use of configuration registers. In one embodiment, Peripheral Components Interconnect (PCI) bus configuration registers may be used. An indirect register model may be used to limit the number of configuration space registers consumed. In one embodiment, the following PCI configuration space registers are used:

VIS_ADDR—FSB Visibility Register File Address
  Offset Address: 9Fh
  Default Value: 00h
  Access: Read/Write
  Size: 8 bits
  Together with the VIS_DATA register, the VIS_ADDR register allows writing and reading of the data to and from FSB visibility register file. This register file is used to "arm" the FSB visibility channels. In this embodiment, there are 3 channels, channels 1, 2 and 3. The FSB visibility register file registers may be arranged as fifteen 32-bit registers as follows:

| Address in the register file | Field |
| --- | --- |
| 0 | ARM-1 Mask/Control field |
| 1 | ARM-1 Addr_A field |
| 2 | ARM-1 Req_AB field |
| 3 | ARM-1 Data_High field |
| 4 | ARM-1 Data_Low field |

-continued

| Address in the register file | Field |
| --- | --- |
| 5 | ARM-2 Mask/Control field |
| ... | ... |
| 9 | ARM-2 Data_Low field |
| 10 | ARM-3 Mask/Control field |
| ... | ... |
| 14 | ARM-3 Data_Low field |

| Bits | Description |
| --- | --- |
| 7:4 | Reserved |
| 3:0 | Address to be read or written from to the FSB visibility register file. The address points to one of the fifteen 32-bit registers in this register file. Software will set this field. The next read or write to the VIS_DATA configuration register will have the effect of reading or writing corresponding to the VIS_ADDR entry in the FSB visibility register file. |

VIS_DATA_FSB Visibility Register File Data
  Offset Address: A0–A3h
  Default value: 0000h
  Access: Read/Write
  Size:32 bits
  The VIS_DATA register, together with the VIS_ADDR register, is used to access the FSB visibility register file. Reading from or write to this register accesses an entry in the FSB visibility register file corresponding to the VIS_ADDR.

| Bits | Description |
| --- | --- |
| 31:0 | Data to be written to the VIS_ADDR entry in the FSB visibility register on writes or read from the VIS_ADDR entry on reads. |

All of these registers, signals, access techniques, and the like are detailed only for one example embodiment. It is to be understood that different register arrangements, access techniques, or even other storage elements that are not necessarily referred to as registers may be employed. Additionally, the amount of triggering information and masking information may be varied to accommodate different system environments.

Figure 8:
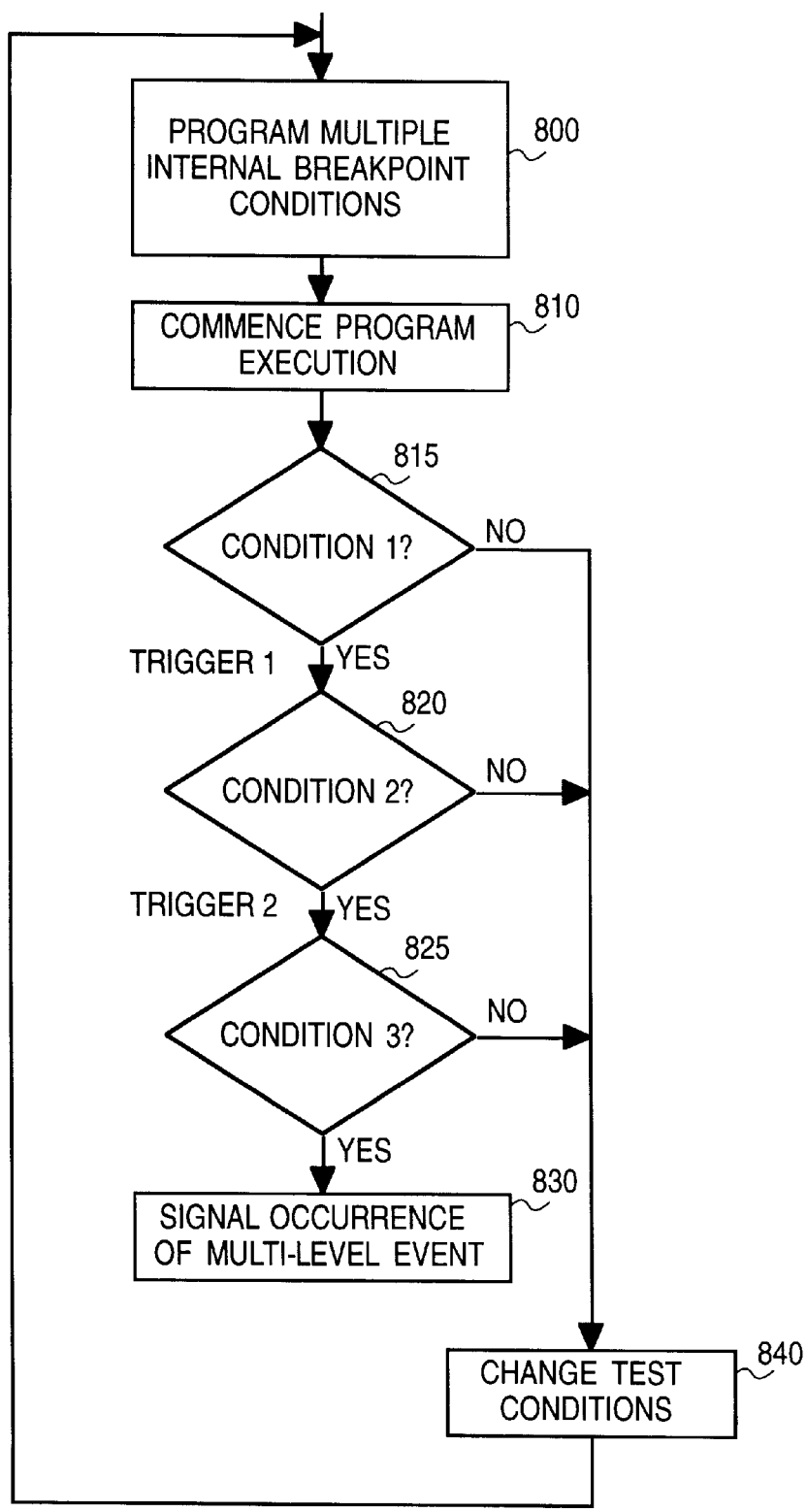
FIG. 8 illustrates one embodiment of a method of performing multi-level breakpoint triggering.

FIG. 8 illustrates one embodiment of a method of performing multiple-transaction, multi-level breakpoint triggering. In the embodiment shown in FIG. 8, several instantiations of previously discussed logic, such as the state machine logic discussed with respect to FIG. 6, may be employed to provide multi-level breakpoint capability. Such capability allows more sophisticated diagnostic analysis to be performed. As indicated in block 800, multiple internal breakpoint conditions may be programmed via programmable registers. For example, three sets of ReqA, ReqB, and data combinations (with appropriate masks) may be programmed into the breakpoint detector registers.

In block 810, program execution commences for the program being debugged or otherwise analyzed (e.g., performance analysis). In a complex system environment, the results of a particular test may vary depending on other conditions of the system, making easy test repetition desirable for efficient testing. Repeated easy detection of a set of events may also be useful in characterizing a particular failure or in characterizing program performance. For example, a bug may only occur under certain conditions, and many iterations may be needed to isolate passing and failing profiles. Additionally, system performance, as may be measured by considering the temporal relationship between breakpoint-detector-signaled events, varies greatly depending on the system activity that is occurring at the time the program is being executed. Either of these phenomenon may be analyzed with a multi-level breakpoint detector.

Accordingly, the occurrence of breakpoint conditions one, two, and three are detected respectively in blocks 815, 820 and 825. If any of these conditions does not occur, the test may be deemed to have not succeeded in showing the desired event. Thus, as indicated in block 840, the test conditions may be altered, and the test repeated beginning at block 800. In some embodiments, the conditions in blocks 815, 820, and 825 need not occur sequentially. They may all be tested simultaneously and signaled as they occur. In performance modeling, tests may be repeatedly performed even though all breakpoint signaled events do occur and may involve fewer or more breakpoint events.

Figure 9:
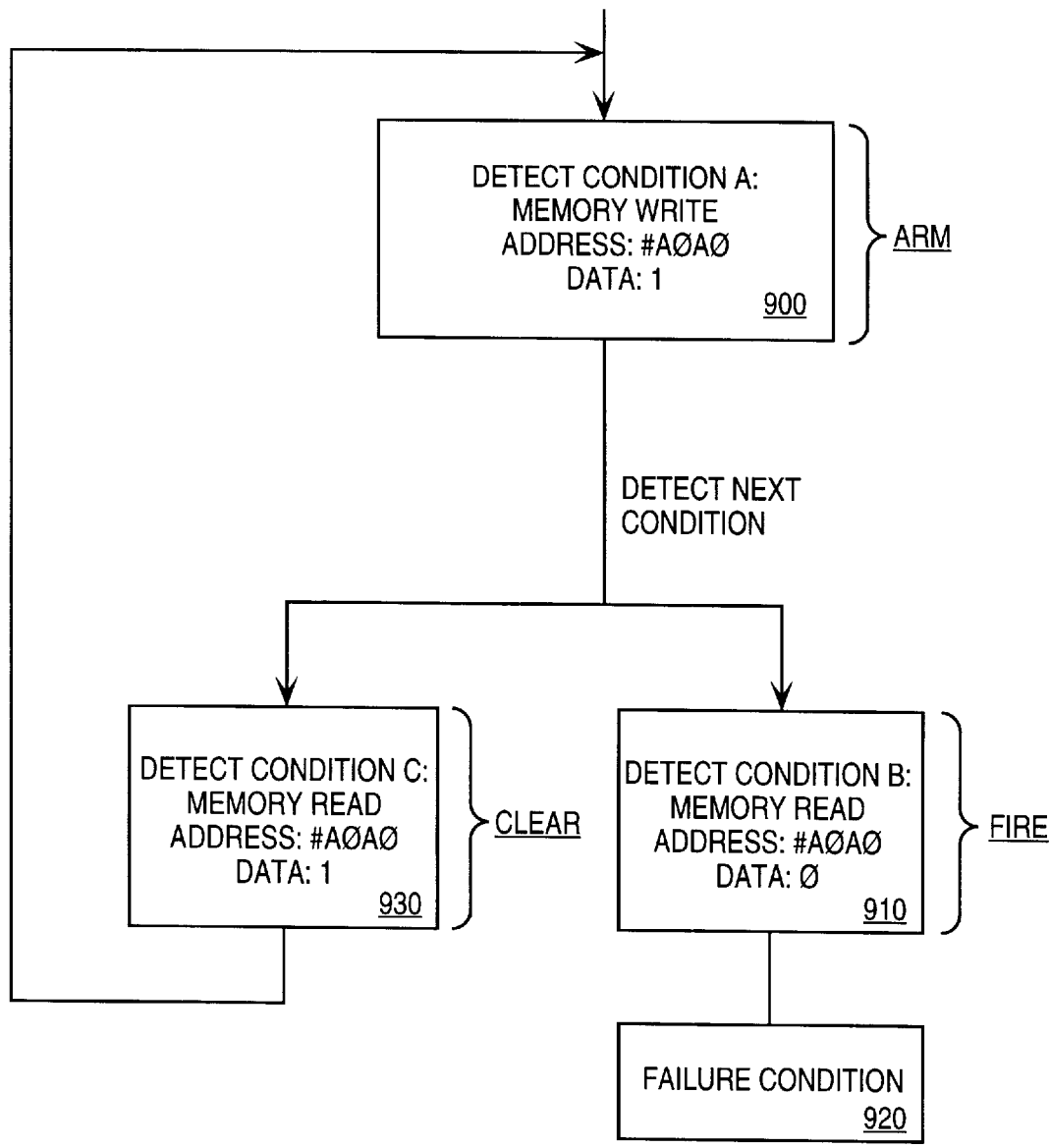
FIG. 9 illustrates the flow of operations for a multi-level breakpoint debugging scenario according to one embodiment.

FIG. 9 illustrates the use of multi-level breakpoint capabilities in order to detect an error (e.g., a hardware error causing an erroneous data read to occur). In block 900, condition A is detected, and this arms external logic to capture processor state if a failure occurs. In the illustrated example, a memory write of the value one to address A0A0 (hexadecimal) occurs. The breakpoint detect logic continues monitoring bus transactions and is set to detect a read from location A0A0. If the read returns a 1 as indicated in block 930, the program performed correctly, and the external logic is cleared. More testing may be performed by returning to block 900. If the read returns a 1 as indicated in block 910, the failure has occurred as indicated in block 920, and the external logic fires in response to the breakpoint detector signaling condition B's occurrence. The external logic may then capture the state of the processor, the system, or other relevant information.

Figure 10:
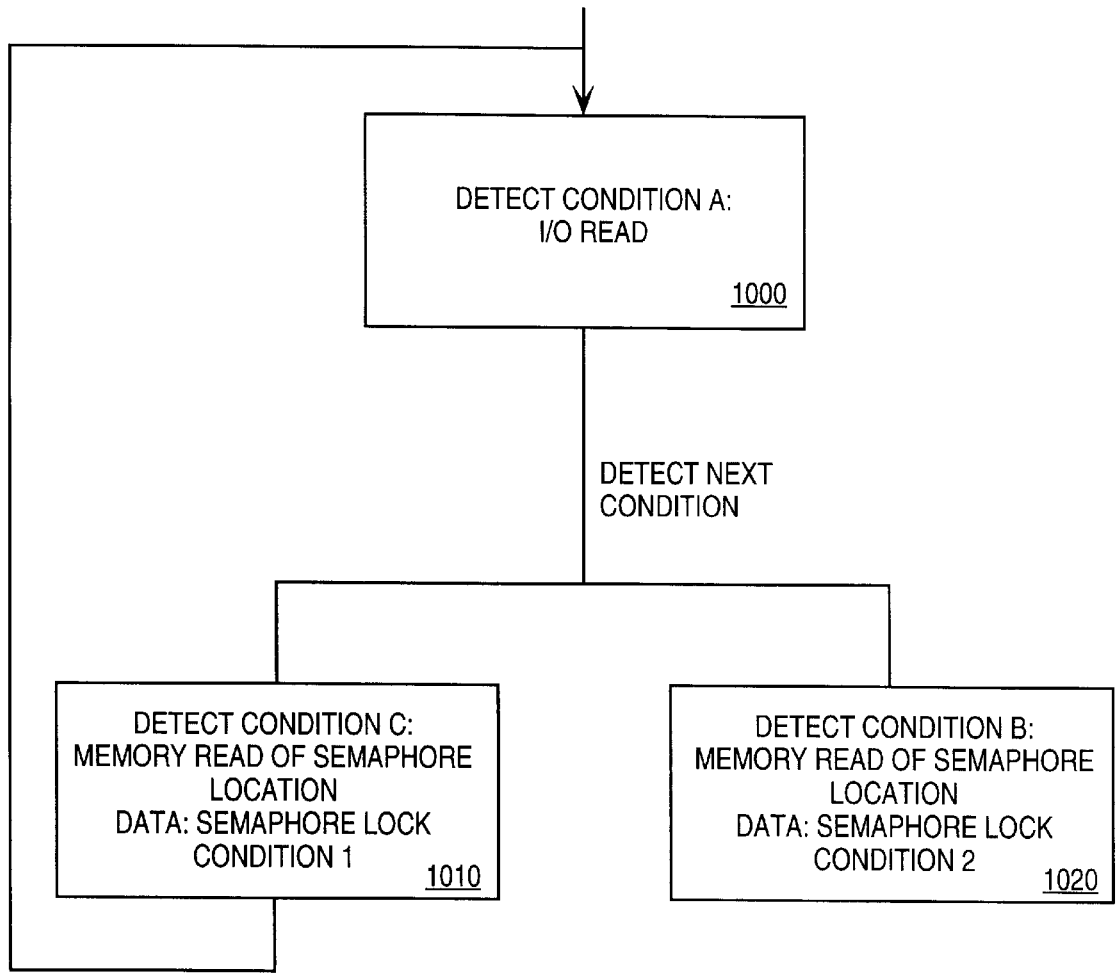
FIG. 10 illustrates the flow of operations for another multi-level breakpoint debugging scenario according to one embodiment.

FIG. 10 illustrates another application of multi-level breakpoint triggering for one embodiment. In this example, the first triggering event is an I/O read as indicated in block 1000. The breakpoint logic continues monitoring bus events for the occurrence of a read to a location known to contain a semaphore variable. As indicated in block 1010, if the semaphore returns a first lock condition (e.g., the semaphore indicates a lock), then the test may be repeated. In this case, the breakpoint detector is cleared because the condition of the semaphore being (perhaps erroneously) unlocked does not occur. If the semaphore returns a second lock condition (e.g., unlocked) as indicated in block 1020, an error may be detected. Thus, block 1020 may be a "fire" block and block 1010 may be a "clear" block.

Figure 11:
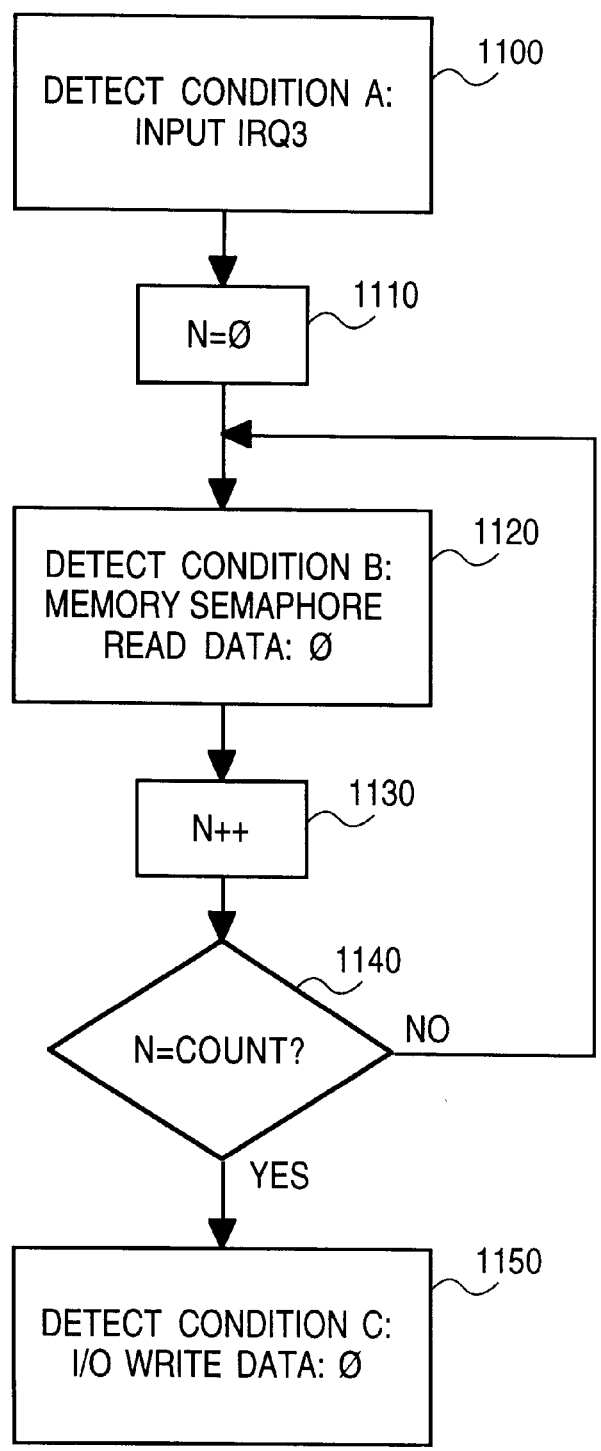
FIG. 11 illustrates the flow of operations for a multi-level breakpoint analysis scenario according to one embodiment.

FIG. 11 illustrates another application of multi-level breakpoint triggering for one embodiment. This example illustrates the detection of three sequential conditions. Furthermore, FIG. 11 illustrates the use of additional logic to allow repeating of one or more conditions (e.g., to allow execution through a program loop). In block 1100, the first condition, an interrupt acknowledge cycle indicating interrupt request three (IRQ3), is detected. A counter is set to zero in block 1110 in response to this first occurrence of IRQ3. The second condition, a memory read (in this case a semaphore read with a received data value of 0) is detected as indicated in block 1120. As may be useful in analyzing a program loop, a count is maintained. N is incremented in block 1130 and then compared with a predetermined count in block 1140. If the predetermined count has not yet been reached, the process returns to detecting reads within the loop (returning to block 1120). If the predetermined count is reached, then the breakpoint detector monitors for condition C as indicated in block 1150.

These and many other debugging and program analysis scenarios may be addressed using disclosed breakpoint techniques. Such techniques may advantageously allow observations that may not otherwise be possible or practical. Additionally, such techniques may advantageously allow non-intrusive observations to be made. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. An apparatus comprising:
   bus interface logic to communicate with a bus;
   an integrated breakpoint detector coupled to said bus interface logic, said integrated breakpoint detector to provide a first indication responsive to an occurrence of a predetermined relationship between a programmable value and a condition related to said bus.

2. The apparatus of claim 1 wherein said predetermined relationship is an at least partial match.

3. The apparatus of claim 2 wherein said condition related to said bus is scheduling or dispatch of a bus transaction on said bus, said first indication therefore being provided responsive to an at least partial match between said programmable value and at least a portion of said bus transaction.

4. The apparatus of claim 1 wherein said breakpoint detector is to trigger said first indication in response to both an at least partial match between the programmable value and a request phase of a bus transaction and a subsequent at least partial match of a second programmable value and a data phase of the bus transaction.

5. The apparatus of claim 1 wherein said integrated breakpoint detector is coupled to receive internal-only signals from said bus interface logic.

6. The apparatus of claim 1 wherein said integrated breakpoint detector comprises:
   a request portion storage element capable of storing a triggering request value;
   an address portion storage element capable of storing a triggering address value;
   a data portion storage element capable of storing a triggering data value.

7. The apparatus of claim 6 wherein said integrated breakpoint detector is to trigger said first indication responsive to a match between one or more of said triggering request value and a request portion of a bus transaction, said triggering address value and an address portion of said bus transaction, and said triggering data value and a data portion of said bus transaction.

8. The apparatus of claim 6 wherein said integrated breakpoint detector is to trigger said first indication responsive to a first match between said triggering request value and a request portion of a bus transaction and a second match between said triggering address value and an address portion of said bus transaction, and a third match between said triggering data value and a data portion of said bus transaction.

9. The apparatus of claim 6 wherein said breakpoint detector further comprises:

a second request portion storage element capable of storing a second triggering request value;

a second address portion storage element capable of storing a second triggering address value, said integrated breakpoint detector being coupled to trigger a second indication responsive to a match between said second triggering request value and a second request portion of a second bus cycle and a match between said second triggering address value and a second address portion of second said bus cycle.

10. The apparatus of claim 1 further comprising:

a mask register capable of storing a mask value that is to cause the integrated breakpoint detector to disregard selected bits of said programmable value as a part of detecting the occurrence of the predetermined relationship.

11. The apparatus of claim 1 wherein said integrated breakpoint detector comprises:

a device identification register;

control logic to match data from a selected bus transaction to a request for the selected bus transaction using, in part, the device identification register.

12. The apparatus of claim 1 wherein said breakpoint detector comprises:

a plurality of programmable register sets, each of said plurality of programmable register sets being capable of storing triggering request information and triggering data information;

comparison logic to generate one of a plurality of external indicators responsive to an at least partial match of one of said plurality of programmable register sets to a multiple phase bus transaction.

13. integrated circuit comprising:

a processor;

a bus;

a memory interface integrated onto a single integrated circuit with said processor, and coupled to communicate with said processor via said bus, said bus being substantially internal to said apparatus;

a breakpoint detector to provide a first indication responsive to a predetermined relationship between a programmable value and a condition related to said bus.

14. The integrated circuit of claim 13 further comprising:

a driver circuit coupled to receive said first indication and to drive an externally observable indication.

15. The integrated circuit of claim 14 wherein said breakpoint detector comprises:

a programmable register to store a value;

a comparator circuit coupled to provide the first indication.

16. The integrated circuit of claim 15 wherein said breakpoint detector further comprises:

a programmable mask register to store a mask value;

a mask circuit coupled to said programmable mask register, the mask circuit to prevent comparison of a masked subset of bits in the value stored in the programmable register, the masked subset being determined by said mask value.

17. The integrated circuit of claim 13 wherein said breakpoint detector is capable of detecting combinations of address, data, and request information on the bus.

18. The integrated circuit of claim 13 wherein said programmable value comprises a programmable address value, a programmable request value, and a programmable data value, and wherein the breakpoint detector comprises:

request match logic to provide a first indication when the programmable address value matches address data for a request cycle on said bus and the programmable request value matches control data for said request cycle on said bus;

data match logic to provide a second indication responsive to the programmable data value matching data on said bus.

19. The integrated circuit of claim 18 wherein said data match logic comprises:

a device ID register;

data match control logic to compare a device ID value stored in said device ID register to match said request cycle to a corresponding data cycle.

20. The integrated circuit of claim 13 wherein said memory interface includes a bus state machine and wherein said breakpoint detector is coupled to said bus state machine to receive internal bus state machine signals not available on said bus.

21. The integrated circuit of claim 13 wherein said processor includes a bus state machine to track the state of the bus and wherein said breakpoint detector is coupled to said bus state machine to receive internal bus state machine signals not available on said bus.

22. A method comprising:

programming a first register in a bus agent with a first value relating to a bus condition;

detecting an occurrence of the bus condition; and generating an external indication of the occurrence of the bus condition.

23. The method of claim 22 wherein the first register is a request register, further comprising:

programming the request register;

programming an address register.

24. The method of claim 23 wherein detecting comprises:

detecting a match between values stored in the address register, values stored in the request register, and corresponding values internal to the bus agent.

25. The method of claim 22 further comprising:

programming a mask register to specify a selected subset of values in said first register to match in order to detect occurrence of the bus condition.

26. The method of claim 22 wherein detecting further comprises:

detecting a request phase of a bus transaction;

detecting a deferred reply data phase of said bus transaction.

* * * * *